United States Patent
Schmitt et al.

(10) Patent No.: US 12,424,680 B2
(45) Date of Patent: *Sep. 23, 2025

(54) HOUSING ASSEMBLY FOR A BATTERY MODULE, ELECTRONICS HOUSING, BATTERY HOUSING, AND BATTERY MODULE

(71) Applicant: Robert Bosch GmbH, Stuttgart (DE)

(72) Inventors: Markus Schmitt, Tamm (DE); Benjamin Kopp, Remseck Am Neckar (DE); Ralph Glemser, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 746 days.

This patent is subject to a terminal disclaimer.

(21) Appl. No.: 17/837,907

(22) Filed: Jun. 10, 2022

(65) Prior Publication Data

US 2022/0399597 A1 Dec. 15, 2022

(30) Foreign Application Priority Data

Jun. 11, 2021 (DE) .................... 102021205960.0

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/6556* (2015.04); *H01M 50/204* (2021.01)

(58) Field of Classification Search
CPC .......... H01M 10/613; H01M 10/6556; H01M 10/6568; H01M 50/204
See application file for complete search history.

(56) References Cited

U.S. PATENT DOCUMENTS

2015/0064522 A1 3/2015 Kim
2020/0036066 A1 1/2020 Cho et al.
(Continued)

FOREIGN PATENT DOCUMENTS

AT 514746 A1 3/2015
DE 102014007638 A1 11/2015
(Continued)

OTHER PUBLICATIONS

Non-final Office Action issued by the U.S. Patent Office for U.S. Appl. No. 17/862,592 dated Mar. 31, 2025 (8 pages).

*Primary Examiner* — Kevin E Yoon
(74) *Attorney, Agent, or Firm* — Michael Best & Friedrich LLP

(57) ABSTRACT

A housing assembly (11) for a battery module (10), comprising an electronics housing (12) for electronics components having an electronics cooling channel opening (13), and comprising a battery housing (15) for battery cells having a first battery cooling channel opening (16) and a second battery cooling channel opening (17), wherein, in an assembled state of the housing assembly (11), the electronics cooling channel opening (13) is positioned adjacently to the first battery cooling channel opening (16), and, next to the first battery cooling channel opening (16) and/or next to the second battery cooling channel opening (17), there is formed at least one inclined fluid drainage channel (18, 19) for a defined fluid drainage from the battery housing (15).

16 Claims, 3 Drawing Sheets

(51) Int. Cl.
*H01M 10/6556* (2014.01)
*H01M 50/204* (2021.01)

(56) References Cited

U.S. PATENT DOCUMENTS

| | | | |
|---|---|---|---|
| 2020/0168967 A1 | 5/2020 | Kopp et al. | |
| 2020/0328483 A1 | 10/2020 | Kopp et al. | |
| 2022/0399597 A1* | 12/2022 | Schmitt | H01M 50/204 |
| 2023/0012291 A1 | 1/2023 | Schmitt et al. | |

FOREIGN PATENT DOCUMENTS

| | | |
|---|---|---|
| DE | 102018111244 A1 | 11/2019 |
| DE | 102019205388 A1 | 10/2020 |
| DE | 102019214199 A1 | 3/2021 |
| DE | 102019127230 A1 | 4/2021 |
| DE | 102019215338 A1 | 4/2021 |

* cited by examiner

HOUSING ASSEMBLY FOR A BATTERY MODULE, ELECTRONICS HOUSING, BATTERY HOUSING, AND BATTERY MODULE

BACKGROUND OF THE INVENTION

The present invention relates to a housing assembly for a battery module, comprising an electronics housing for electronics components having an electronics cooling channel opening, and comprising a battery housing for battery cells having a first battery cooling channel opening and a second battery cooling channel opening, wherein, in an assembled state of the housing assembly, the first electronics cooling channel opening is positioned adjacently to the first battery cooling channel opening. The invention further relates to an electronics housing and a battery housing for such a housing assembly. In addition, the invention relates to a battery module having such a housing assembly.

It is known to connect individual battery cells together to form a battery module. Battery modules can in turn be interconnected to form a battery system. Battery cells heat up as a result of chemical conversion processes, especially when power is delivered and consumed quickly. The more powerful the battery module, the greater the heating can become and the more important is the need for an effective cooling system. This is particularly due to the fact that the service life of a battery module decreases significantly at an operating temperature of more than approximately 40° C. Furthermore, it is important to achieve a temperature gradient that is as constant as possible from battery cell to battery cell.

In known systems, the temperature control of battery modules is achieved mainly by using a coolant. The coolant is conducted through cooling channels in the battery module. It is also known that a battery module of the type in question has an electronics housing for enclosing electrical and/or electronics components. These components also have to be temperature-controlled and, in particular, cooled. It is known from the German patent applications DE 10 2019 205 388 A1, DE 10 2019 215 338 A1 and DE 10 2019 214 199 A1 to form a second cooling plane for this purpose. The different cooling planes are provided in different housing components, i.e. in a battery housing as well as in an electronics housing. This makes it necessary to connect to one another in a fluid-tight manner the two housing parts having the integrated cooling channels.

Furthermore, a battery module and/or battery system of the type in question is often installed in a vehicle exterior and should therefore be able to withstand corrosive loads over the service life of the vehicle. In particular, the sealing points between the two housing components are affected with regard to corrosive infiltration. Further requirements for the battery module to be as fluid-resistant as possible arise when cleaning the battery module with a high-pressure cleaner.

The above requirements relate in particular to regions of the battery module with coolant bores which run vertically when the battery module is installed and cannot always be avoided at various interfaces for reasons relating to installation space. Such coolant bores are particularly susceptible to corrosive infiltration.

SUMMARY OF THE INVENTION

Within the scope of the present invention, a system for preventing undesirable fluid ingress and/or corrosion on generic housing assemblies is now proposed. In particular, a housing assembly, an electronics housing, a battery housing, and a battery module are proposed. Here, features described in conjunction with the housing assembly naturally also apply in conjunction with the electronics housing according to the invention, the battery housing according to the invention, the battery module according to the invention, and vice versa in each case, so that reference is and/or can always be made reciprocally with respect to the disclosure concerning the individual aspects of the invention.

In accordance with a first aspect of the present invention, a housing assembly for a battery module is provided. The housing assembly comprises an electronics housing for electronics components having an electronics cooling channel opening, and a battery housing for battery cells having a first battery cooling channel opening and a second battery cooling channel opening. In an assembled state of the housing assembly, the electronics cooling channel opening is positioned adjacently to the first battery cooling channel opening. Next to the first battery cooling channel opening and/or next to the second battery cooling channel opening, there is formed at least one inclined fluid drainage channel for a defined drainage of fluid from the battery housing.

Within the scope of the present invention, it has been found that modifying housing assemblies of the type in question with at least one specially positioned fluid drainage channel is a simple and cost-effective way of keeping fluids and, in particular, water, for example condensation, away from critical points on and/or in the housing assembly, i.e. on the electronics housing and/or on the battery housing. Corrosion can be prevented at these points in a correspondingly simple manner. Furthermore, frost damage to the housing assembly and/or to add-on parts on the housing assembly can be prevented or at least reduced by freezing water standing on the housing assembly.

In an operating state of the battery module, the at least one fluid drainage channel is configured obliquely in particular with respect to the direction of gravity so that fluids such as water do not remain on or in the at least one fluid drainage channel, but can drain away from the battery housing via the latter. Thus, with respect to a battery module in the operating state, the at least one fluid drainage channel is preferably designed to be non-parallel and non-orthogonal to the direction of gravity. For designing the at least one fluid drainage channel at a transition between the coolant bores of the battery housing and the electronics housing, the flat or horizontal surface, i.e. a surface that is orthogonal or substantially orthogonal to the direction of gravity in the operating state of the battery module, is minimized on the battery housing, and the remaining surface in the form of the inclined fluid drainage channels is stepped downwards. This allows condensate to always drain away from the battery housing and/or into regions that are not critical with respect to corrosion. It has proven particularly advantageous if a first inclined fluid drainage channel for a defined fluid drainage from the battery housing is formed next to the first battery cooling channel opening and a second fluid drainage channel for a defined fluid drainage from the battery housing is formed next to the second battery cooling channel opening. The first fluid drainage channel and the second fluid drainage channel are preferably spaced apart and/or fluidically separated from each other.

The battery housing and/or the electronics housing are optionally formed with a cathodic dip coating, a powder coating and/or an anodized coating. The battery housing and/or the electronics housing thus have increased corrosion protection compared to a base material of the housing in question, in particular in the region of horizontal surfaces. The base material of a main body is preferably a die-cast aluminum alloy. The coating according to the invention avoids corrosive infiltration which could emanate from uncoated regions. In particular, the coating is applied in regions that are in contact with coolant during an operation of the battery module. The geometry of the battery housing and/or of the electronics housing is preferably formed in the coated regions such that these regions can remain in the cast state without having to remove a cast skin by mechanical machining. Compared with mechanically machined regions, this results in even more effective corrosion protection.

By this, it can be understood that the electronics cooling channel opening is positioned adjacently to the first battery cooling channel opening, that the electronics cooling channel opening is positioned directly adjacently to the first battery cooling channel opening, contacting the first battery cooling channel opening and/or next to the first battery cooling channel opening. Preferably, the electronics cooling channel opening is positioned concentrically with the first battery cooling channel opening for fluid communication between a coolant bore to the electronics cooling channel opening and a coolant bore to the first battery cooling channel opening. The battery housing is preferably configured to receive lithium ion and/or lithium polymer battery cells. The coolant bores or the cooling channels are configured for cooling the battery cells by means of cooling fluid, in particular by means of a water/glycol mixture.

The housing assembly can comprise a connecting flange having an outer flange side, a tube portion for producing a coolant connection between the electronics housing and the battery housing, and a fastening portion for producing a mechanical connection between the electronics housing and the battery housing, wherein the outer flange side is configured for conducting a liquid on the outer flange side into the at least one fluid drainage channel.

According to a further embodiment of the present invention, it is possible that in a housing assembly the at least one fluid drainage channel is designed in each case in the form of an open-edge recess in the battery housing. In this way, the at least one fluid drainage channel and/or the battery housing can be manufactured in a particularly simple manner. In particular, it is possible to form the fluid drainage channel as a one-piece and/or monolithic component of the battery housing. Preferably, a first inclined fluid drainage channel for a defined fluid drainage from the battery housing is formed next to the first battery cooling channel opening, and a second fluid drainage channel for a defined fluid discharge from the battery housing is formed next to the second battery cooling channel opening, wherein the first fluid drainage channel and the second fluid drainage channel are each designed in the form of an open-edge depression. The inclination of the at least one fluid drainage channel runs downwards towards the edge of the battery housing in order to achieve the desired water drainage. The at least one fluid drainage channel preferably extends along an opening edge of the first battery cooling channel opening and/or the second battery cooling channel opening.

Furthermore, it is possible that in a housing assembly according to the invention the battery housing has a base outer side in the region of the first battery cooling channel opening and the second battery cooling channel opening, wherein an opening edge is formed on the first battery cooling channel opening and/or on the second battery cooling channel opening, which opening edge extends in an opening direction beyond a plane of the base outer side. In other words, at an interface between the coolant bores of the battery housing and the electronics housing, an edge can be formed on the battery housing, said edge being raised relative to a base surface of the battery housing. The opening edge can be used to prevent condensate from an area around the cooling channel opening in question from entering the associated coolant bore, in a simple yet effective manner. The opening edge can thus be understood in each case as a protective ring for preventing fluid from flowing from a base surface of the battery housing into the preferably vertically configured coolant bores. In conventional battery housings, it has previously been attempted to dispense with such projections wherever possible.

In addition, it is possible that in a housing assembly according to the present invention a drip edge partially surrounding the electronics cooling channel opening is formed on the electronics cooling channel opening, wherein the drip edge extends beyond the electronics cooling channel opening in an opening direction of the electronics cooling channel opening. In the assembled state of the housing assembly, the drip edge can thus extend at least partially in a cap-like manner over a battery cooling channel opening, in particular over the first battery cooling channel opening. In this way, fluids such as condensation can be prevented in a simple yet effective manner from entering a battery cooling channel opening from an outer side of the electronics housing. Preferably, the drip edge extends around only a part of the electronics cooling channel opening. The drip edge can be configured as part of an outer wall of the electronics housing. The drip edge configured as part of the outer wall can extend around the electronics cooling channel opening by less than 50%, in particular by less than 30%, i.e. only over a corresponding partial radius. In other words, at the transition between the coolant bores of the battery housing and the electronics housing, a drip edge is formed on the electronics housing which prevents condensate that runs down from entering the coolant bore on the battery housing. The drip edge can thus be understood to be an edge raised to a horizontal base surface directly next to the electronics coolant channel opening.

In a housing assembly according to the invention, the drip edge can be designed such that a liquid drips at the drip edge into the at least one fluid drainage channel. In other words, the drip edge can be positioned and/or designed in such a way that, for example, condensation on an outer side of the electronics housing in the region of the drip edge can be guided along the latter in a targeted manner into the at least one fluid drainage channel. This also makes it possible to prevent or at least reduce the entry of water into the housing assembly and the associated risk of corrosion.

According to a further variant of the present invention, it is possible that the drip edge has a larger radius than the electronics cooling channel opening and that a connecting slope is formed between the electronics cooling channel opening and the drip edge in a region between the electronics cooling channel opening and the drip edge. The connecting slope can be particularly useful for mounting a sealing means between the electronics cooling channel opening and the battery cooling channel opening. In addition, the connecting slope can be used to create a tolerance compensation in relation to the battery housing in the region of the battery cooling channel opening. This means that, even with manufacturing tolerances and/or a slightly modified design of the battery housing, the drip edge can still have the desired effect. The connecting bevel can extend from an edge or just next to the edge of the electronics cooling channel opening to the drip edge or just next to the drip edge in a partial ring shape. Accordingly, the connecting bevel has a larger radius than the electronics cooling channel opening and a smaller radius than the connecting edge.

In addition, it is possible that in a housing assembly according to the present invention the electronics housing and/or the battery housing are each formed in one piece and/or monolithically. This makes the electronics housing and/or the battery housing particularly robust with respect to possible water deposits. Joints between components can be prevented to the greatest possible extent. The electronics housing and/or the battery housing are each preferably designed in the form of a cast part, in particular in the form of a die-cast aluminum component.

According to another aspect of the present invention, an electronics housing is provided for a housing assembly as described in detail above. The electronics housing comprises an electronics cooling channel opening, wherein a drip edge partially surrounding the electronics cooling channel opening is formed on the electronics cooling channel opening, and wherein the drip edge extends beyond the electronics cooling channel opening in an opening direction of the electronics cooling channel opening. Within the scope of the invention, there is additionally provided a battery housing for a housing assembly as described above. The battery housing comprises a first battery cooling channel opening and a second battery cooling channel opening, wherein, next to the first battery cooling channel opening and/or next to the second battery cooling channel opening, at least one inclined fluid drainage channel is formed for a defined fluid drainage from the battery housing. Thus, the electronics housing according to the invention and the battery housing according to the invention provide the same advantages as have been described in detail with reference to the housing assembly according to the invention.

In addition, a battery module having a housing assembly as described in detail above is provided, wherein the battery module has a plurality of battery cells arranged in the battery housing. Thus, the battery module according to the invention also provides the advantages described above.

Further measures improving the invention will become apparent from the following description of various exemplary embodiments of the invention, which are shown schematically in the figures. All features and/or advantages arising from the claims, the description or the figures, including constructional details and spatial arrangements, may be essential to the invention both individually and in the various combinations.

Elements with the same function and mode of operation are each provided with the same reference signs in the figures.

DETAILED DESCRIPTION

Figure 1:
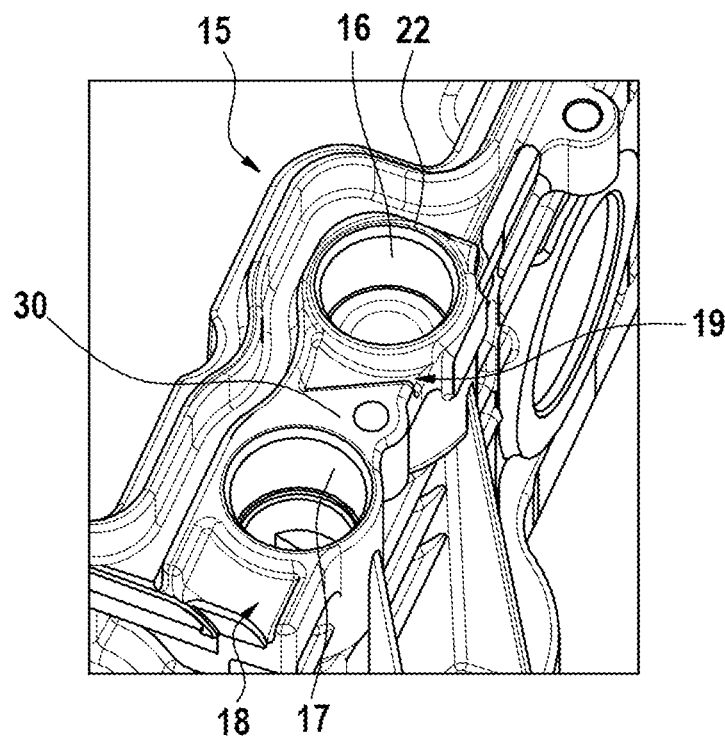
FIG. 1 shows a perspective view of a battery housing according to a preferred embodiment of the present invention.
Figure 3:
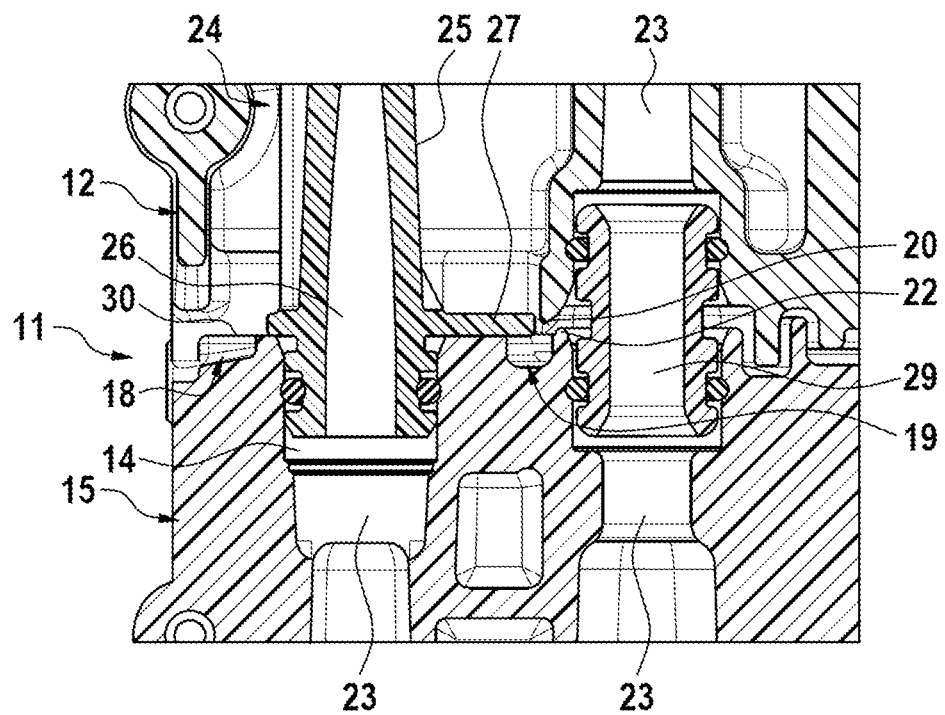
FIG. 3 shows a sectional side view of a housing assembly according to a preferred embodiment of the present invention.

FIG. 1 shows a monolithic battery housing 15 for a housing assembly 11 shown in FIG. 3. The battery housing has a first battery cooling channel opening 16 and a second battery cooling channel opening 17. Next to the first battery cooling channel opening 16, a first inclined fluid drainage channel 18 is formed for a defined fluid drainage from the battery housing 15. Next to the second battery cooling channel opening 17, a second inclined fluid drainage channel 19 is formed for a defined fluid drainage from the battery housing 15.

As can be seen in FIG. 1, the first fluid drainage channel 18 and the second fluid drainage channel 19 are each designed in the form of an open-edge recess in the battery housing 15 and extend around a partial radius of the battery cooling channel openings 16, 17. The battery housing 15 has a base outer side 30 in the region of the first battery cooling channel opening 16 and the second battery cooling channel opening 17, wherein an opening edge 22 is formed on the first battery cooling channel opening 16 and extends in an opening direction beyond a plane of the base outer side 30.

Figure 2:
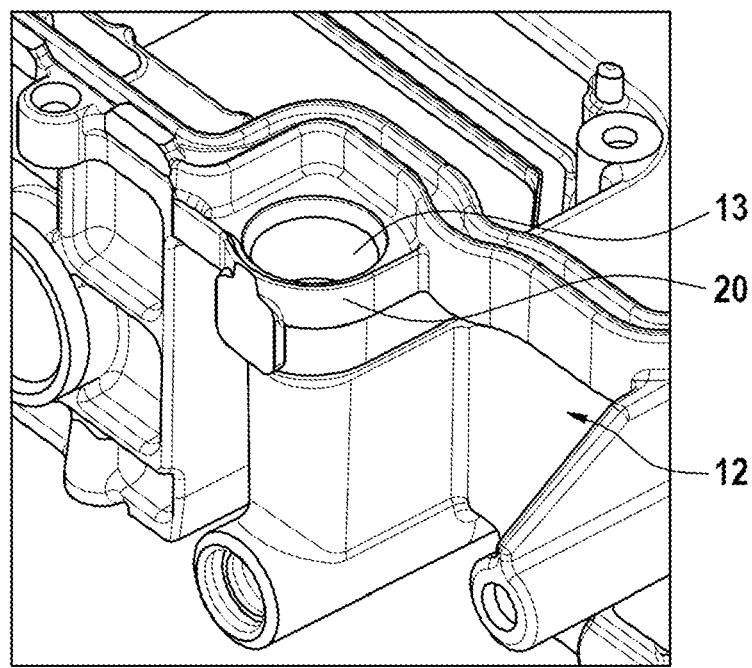
FIG. 2 shows a perspective view of an electronics housing according to a preferred embodiment of the present invention.

FIG. 2 shows a monolithic electronics housing 12 for the housing assembly 11 shown in FIG. 3. The electronics housing 12 has an electronics cooling channel opening 13, wherein a drip edge 20 partially surrounding the electronics cooling channel opening 13 is formed on the electronics cooling channel opening 13, and wherein the drip edge 20 extends beyond the electronics cooling channel opening 13 in an opening direction of the electronics cooling channel opening 13. The drip edge 20 is formed such that a liquid such as condensation on the outside of the electronics housing 12 in the region of the drip edge 20 can drip from the latter into the at least one fluid drainage channel 18, 19. The drip edge 20 has a larger radius than the electronics cooling channel opening 13. In a region between the electronics cooling channel opening 13 and the drip edge 20, a connecting slope is formed between the electronics cooling channel opening 13 and the drip edge 20, and accordingly has a smaller radius than the drip edge 20 and a larger radius than the electronics cooling channel opening 13.

Figure 6:
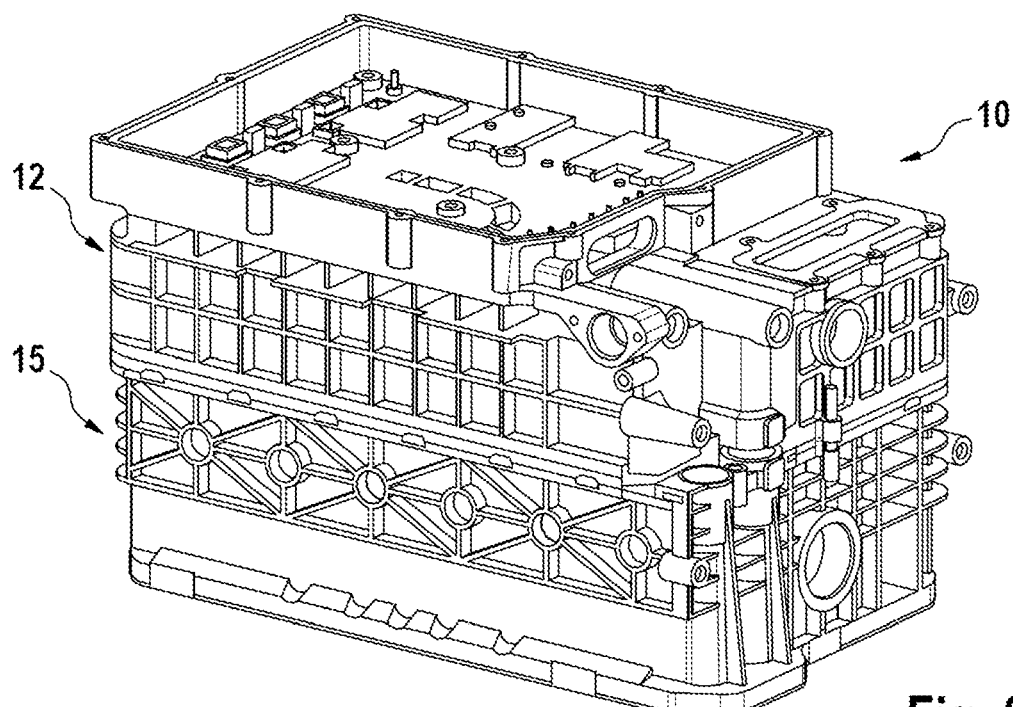
FIG. 6 shows a perspective view of a battery module according to a preferred embodiment of the present invention.

FIG. 3 shows a housing assembly 11 for a battery module 10 shown in FIG. 6 in a sectional side view. The housing assembly 11 comprises the electronics housing 12 for electronics components and also comprises the battery housing 15 for battery cells. In the shown assembled state of the housing assembly 11, the electronics cooling channel opening 13 or an end portion of a coolant bore 23 or a coolant channel of the electronics housing 12 is positioned adjacently to the first battery cooling channel opening 16 or to an end portion of a coolant bore 23 of the battery housing 15. For a coolant connection between the electronics housing 12 and the battery housing 15, the housing assembly 11 comprises a connecting flange 24. The connecting flange 24 has an outer flange side 25, a tube portion 26 for the coolant connection, and a fastening portion 27 for producing a mechanical connection between the electronics housing 12 and the battery housing 15. The flange outer side 25 is designed for conducting a liquid such as condensed water on the flange outer side 25 into the first fluid drainage channel 18 and the second fluid drainage channel 19. The connecting flange 24 is positioned in the coolant bore 23 of the battery housing 15 by means of sealing member 14. As can further be seen with reference to FIG. 3, the contact surface of the connecting flange 24 on the base outer side 30 on the battery housing 15 at the interfaces or transitions between the electronics housing 12 and the battery housing 15 can achieve only a minimal gap, which protects the sealing element 14, for example, against pressurized water by a high-pressure cleaner. Condensate that infiltrates the gap and thus reaches the sealing element despite these measures can still dry off effectively through this gap.

Figure 4:
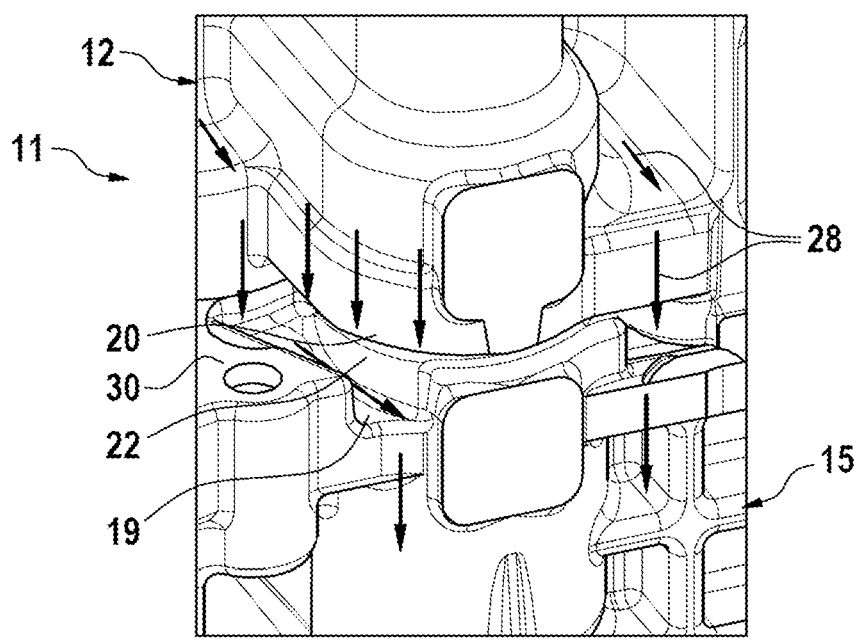
FIG. 4 shows a perspective view of the housing assembly shown in FIG. 3.
Figure 5:
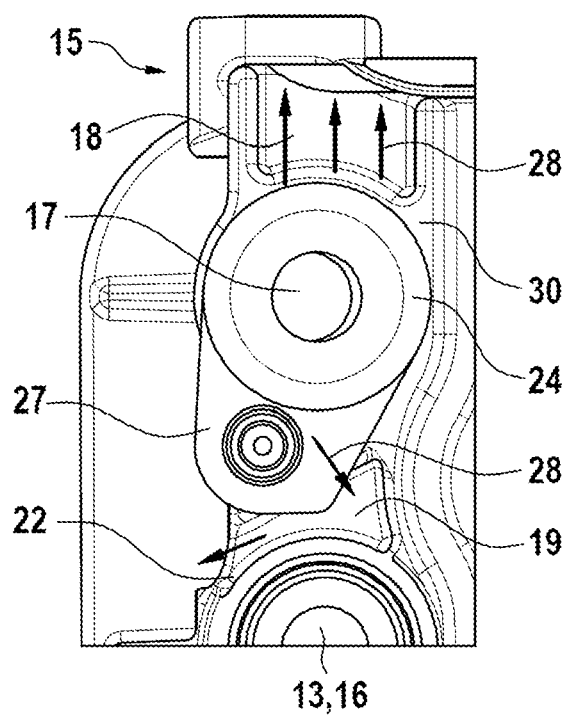
FIG. 5 shows a sectional plan view of a housing assembly according to the preferred embodiment of the present invention.

FIG. 4 shows an assembled state of the housing assembly 11, in which the desired fluid drainage is shown on the outside of the housing assembly 11. As can be seen by looking at FIG. 4, fluids such as water 28, for example condensation or cleaning water, can drain away from the housing assembly 11 via the electronics housing 12, the drip edge 20 and the fluid drainage channels 18, 19 with almost no residue. This can also be seen in a plan view in FIG. 5. In FIG. 5, it can also be seen that a gap between the battery housing 15 and the connecting flange 24 is particularly small, since the fastening portion 27 of the connecting flange 24 circumferentially bears against the horizontal surface or the base outer surface 30 of the battery housing 15.

FIG. 6 shows a battery module 10 with a housing assembly 11 as described above. The housing assembly 11 comprises an electronics housing 12 and a battery housing 15 for housing a plurality of battery cells. The invention allows further design principles in addition to the embodiments shown. That is to say, the invention is not to be considered as limited to the exemplary embodiments explained with reference to the figures.

What is claimed is:

1. A housing assembly (11) for a battery module (10), the housing assembly (11) comprising
an electronics housing (12) for electronics components, the electronics housing (12) having an electronics cooling channel opening (13), and
a battery housing (15) for battery cells, the battery housing (15) having a first battery cooling channel opening (16) and a second battery cooling channel opening (17),
wherein, in an assembled state of the housing assembly (11), the electronics cooling channel opening (13) is positioned adjacently to the first battery cooling channel opening (16), and
wherein the housing assembly (11) further comprises, next to the first battery cooling channel opening (16) and/or next to the second battery cooling channel opening (17), at least one inclined fluid drainage channel (18, 19) for a defined fluid drainage from the battery housing (15).

2. The housing assembly (11) according to claim 1, wherein the at least one fluid drainage channel (18, 19) is configured in each case in the form of an open-edge recess in the battery housing (15).

3. The housing assembly (11) according to claim 2, wherein the battery housing (15) has a base outer side (30) in a region of the first battery cooling channel opening (16) and the second battery cooling channel opening (17), wherein an opening edge (22) is formed on the first battery cooling channel opening (16) and/or on the second battery cooling channel opening (17), which opening edge (22) extends in an opening direction beyond a plane of the base outer side (30).

4. The housing assembly (11) according to claim 3, wherein a drip edge (20) partially surrounding the electronics cooling channel opening (13) is formed on the electronics cooling channel opening (13), wherein the drip edge (20) extends beyond the electronics cooling channel opening (13) in an opening direction of the electronics cooling channel opening (13).

5. The housing assembly (11) according to claim 4, wherein the drip edge (20) is configured such that a liquid drips at the drip edge (20) into the at least one fluid drainage channel (18, 19).

6. The housing assembly (11) according to claim 5, wherein the drip edge (20) has a larger radius than the electronics cooling channel opening (13) and a connecting slope is formed between the electronics cooling channel opening (13) and the drip edge (20) in a region between the electronics cooling channel opening (13) and the drip edge (20).

7. The housing assembly (11) according to claim 6, wherein the electronics housing (12) and/or the battery housing (15) are each formed in one piece and/or monolithically.

8. The housing assembly (11) according to claim 4, wherein the drip edge (20) has a larger radius than the electronics cooling channel opening (13) and a connecting slope is formed between the electronics cooling channel opening (13) and the drip edge (20) in a region between the electronics cooling channel opening (13) and the drip edge (20).

9. The housing assembly (11) according to claim 8, wherein the electronics housing (12) and/or the battery housing (15) are each formed in one piece and/or monolithically.

10. The housing assembly (11) according to claim 1, wherein the battery housing (15) has a base outer side (30) in a region of the first battery cooling channel opening (16) and the second battery cooling channel opening (17), wherein an opening edge (22) is formed on the first battery cooling channel opening (16) and/or on the second battery cooling channel opening (17), which opening edge (22) extends in an opening direction beyond a plane of the base outer side (30).

11. The housing assembly (11) according to claim 1, wherein a drip edge (20) partially surrounding the electronics cooling channel opening (13) is formed on the electronics cooling channel opening (13), wherein the drip edge (20) extends beyond the electronics cooling channel opening (13) in an opening direction of the electronics cooling channel opening (13).

12. The housing assembly (11) according to claim 11, wherein the drip edge (20) is configured such that a liquid drips at the drip edge (20) into the at least one fluid drainage channel (18, 19).

13. The housing assembly (11) according to claim 12, wherein the drip edge (20) has a larger radius than the electronics cooling channel opening (13) and a connecting slope is formed between the electronics cooling channel opening (13) and the drip edge (20) in a region between the electronics cooling channel opening (13) and the drip edge (20).

14. The housing assembly (11) according to claim 11, wherein the drip edge (20) has a larger radius than the electronics cooling channel opening (13) and a connecting slope is formed between the electronics cooling channel opening (13) and the drip edge (20) in a region between the electronics cooling channel opening (13) and the drip edge (20).

15. The housing assembly (11) according to claim 1, wherein the electronics housing (12) and/or the battery housing (15) are each formed in one piece and/or monolithically.

16. A battery module (10) comprising
a housing assembly (11), the housing assembly (11) comprising
an electronics housing (12) for electronics components, the electronics housing (12) having an electronics cooling channel opening (13), and
a battery housing (15), the battery housing (15) having a first battery cooling channel opening (16) and a second battery cooling channel opening (17),
wherein, in an assembled state of the housing assembly (11), the electronics cooling channel opening (13) is positioned adjacently to the first battery cooling channel opening (16), and
wherein the housing assembly (11) further comprises, next to the first battery cooling channel opening (16) and/or next to the second battery cooling channel opening (17), at least one inclined fluid drainage channel (18, 19) for a defined fluid drainage from the battery housing (15), and
a plurality of battery cells arranged in the battery housing (15).

* * * * *